United States Patent
Mujica et al.

(10) Patent No.: US 11,924,903 B2
(45) Date of Patent: Mar. 5, 2024

(54) PREVENTION OF COLLATERAL PROCESS SAFETY RISKS UTILIZING HIGHLY RELIABLE COMMUNICATION THROUGH CLOUD IOT

(71) Applicant: Saudi Arabian Oil Company, Dhahran (SA)

(72) Inventors: Pedro Alejandro Mujica, Dhahran (SA); Herman Roberto Cipriano, Dhahran (SA); Soloman M. Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 231 days.

(21) Appl. No.: 17/064,444

(22) Filed: Oct. 6, 2020

(65) Prior Publication Data
US 2022/0110183 A1 Apr. 7, 2022

(51) Int. Cl.
*H04W 76/25* (2018.01)
*H04L 41/16* (2022.01)
*H04W 84/18* (2009.01)

(52) U.S. Cl.
CPC ............. *H04W 76/25* (2018.02); *H04L 41/16* (2013.01); *H04W 84/18* (2013.01)

(58) Field of Classification Search
None
See application file for complete search history.

(56) References Cited

U.S. PATENT DOCUMENTS 10,466,722 B2 11/2019 Mortensen et al.
2005/0143133 A1* 6/2005 Bridgelall .............. H01Q 1/007
455/562.1

2007/0124026 A1* 5/2007 Troxell ................. G06Q 30/08
700/291
2017/0012878 A1* 1/2017 Rahman ................. H04L 67/52
2018/0299878 A1* 10/2018 Cella ................ G05B 23/0264
(Continued)

FOREIGN PATENT DOCUMENTS

CN 112166491 A * 1/2021 ......... C23C 16/4405

OTHER PUBLICATIONS

PCT International Search Report and Written Opinion in International Appln. No. PCT/US2021/053658, dated Jan. 17, 2022, 16 pages.

*Primary Examiner* — Kenny S Lin
*Assistant Examiner* — Rodrick Mak
(74) *Attorney, Agent, or Firm* — Fish & Richardson P.C.

(57) ABSTRACT

Systems and methods include a computer-implemented method: A first Safety Instrumented Function (SIF) determines that a process equipment event has occurred or is predicted to occur in a first system. A first action to be performed by the first SIF is identified. In response to determining that the process equipment event has occurred or is predicted to occur, the first action is performed by the first SIF to prevent an occurrence of a first hazardous event. A determination is made by a highly-reliable, self-healing communication transmission network that a second action is to be performed in the second SIF to prevent the occurrence of a second hazardous event. In response, a notification is provided by the transmission network to the second SIF that the second action is to be performed. In response to receiving the notification by the second SIF, the second action is performed by the second SIF.

20 Claims, 5 Drawing Sheets

(56) References Cited

U.S. PATENT DOCUMENTS

2019/0121338 A1* 4/2019 Cella .................. G06N 20/00
2019/0294124 A1 9/2019 Law et al.
2021/0157312 A1* 5/2021 Cella .................... G06N 3/02

* cited by examiner

PREVENTION OF COLLATERAL PROCESS SAFETY RISKS UTILIZING HIGHLY RELIABLE COMMUNICATION THROUGH CLOUD IOT

BACKGROUND

The present disclosure applies to safety instrumented systems (SISs) and reliable communication for preventing process safety hazardous events.

Safety Instrumented Functions (SIFs) are widely used in the oil and gas industry and petro-chemical industry to prevent the materialization of Process Safety Events. The use of SIFs, as part of the SISs, are often achieved by using sensing elements, safety logic solvers, and final elements that are dedicated to a specific set of process parameters and process equipment to prevent or mitigate hazardous events.

SUMMARY

The present disclosure describes techniques that can be used to link geographically separated SISs by using redundant, reliable, and functional safety certifiable communication systems among the involved SISs, utilizing for example, Cloud technology, or any other functional safety certified (or certifiable) communication protocol. In some implementations, a computer-implemented method includes the following. A determination is made by a first Safety Instrumented Function (SIF) that a process equipment event has occurred or is predicted to occur in a first system as detected by the first SIF, including identifying, based on the process equipment event occurring, a first action to be performed by the first SIF. In response to determining that the process equipment event has occurred, the first action is performed by the first SIF to prevent an occurrence of a first hazardous event in the first system. A determination is made by a highly-reliable advance global server, via a highly-reliable self-healing communication transmission network using the first action and connecting the first SIF and a second SIF in a second system, that a second action is to be performed in the second SIF to prevent the occurrence of a second hazardous event in the second system. In response to determining the second action to be performed in the second SIF, a notification and command generated by the highly-reliable advance global server is provided via the highly-reliable, self-healing communication transmission network to the second SIF that the second action is to be performed to prevent the occurrence of the second hazardous event in the second system. In response to receiving the notification by the second SIF, the second action is performed to prevent the occurrence of a second hazardous event in the second system.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, techniques of the present disclosure can solve the technical problem of preventing hazardous events that historically repeat themselves in the oil and gas and petro-chemical industries. Hazardous events can include, for example, overfilling a tank with hydrocarbon fuels. Second, techniques of the present disclosure can be used to prevent the escalation of unsafe conditions during the process. Third, implementation of the techniques can provide a support mechanism to existing SISs used in industrial facilities. Fourth, the techniques can enable the source of a hazardous event to be shut down. In the example of the tank overfill, while a conventional SIS configuration can close a tank inlet valve, the conventional SIS configuration does not have a connection with the upstream system that is pumping the fluid when for example physical distance between SISs prevent safety and reliable connection between them. For example, communication in the Cloud between SISs can allow emerging technology to be linked and configured, with autonomy to automatically take the necessary process action to control (shutdown, block, or stop) the source of the hazard located upstream in the process. This can allow equipment, for example stopping a process pump, to avoid the hazardous scenario, such as overfilling of a tank, caused by another event not directly correlated to the pump. This places a technical advantage over commercially available process safety and technical solutions and alternatives that rely on hardwired (or wireless) input/output (I/O) for safety technology bound to physical and/or geographical limitation. For example, this removes distance limitations by using, for example, functional safety certifiable communications embedded in Cloud technology concepts to link SISs that are geographically in different locations separated by large distances.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
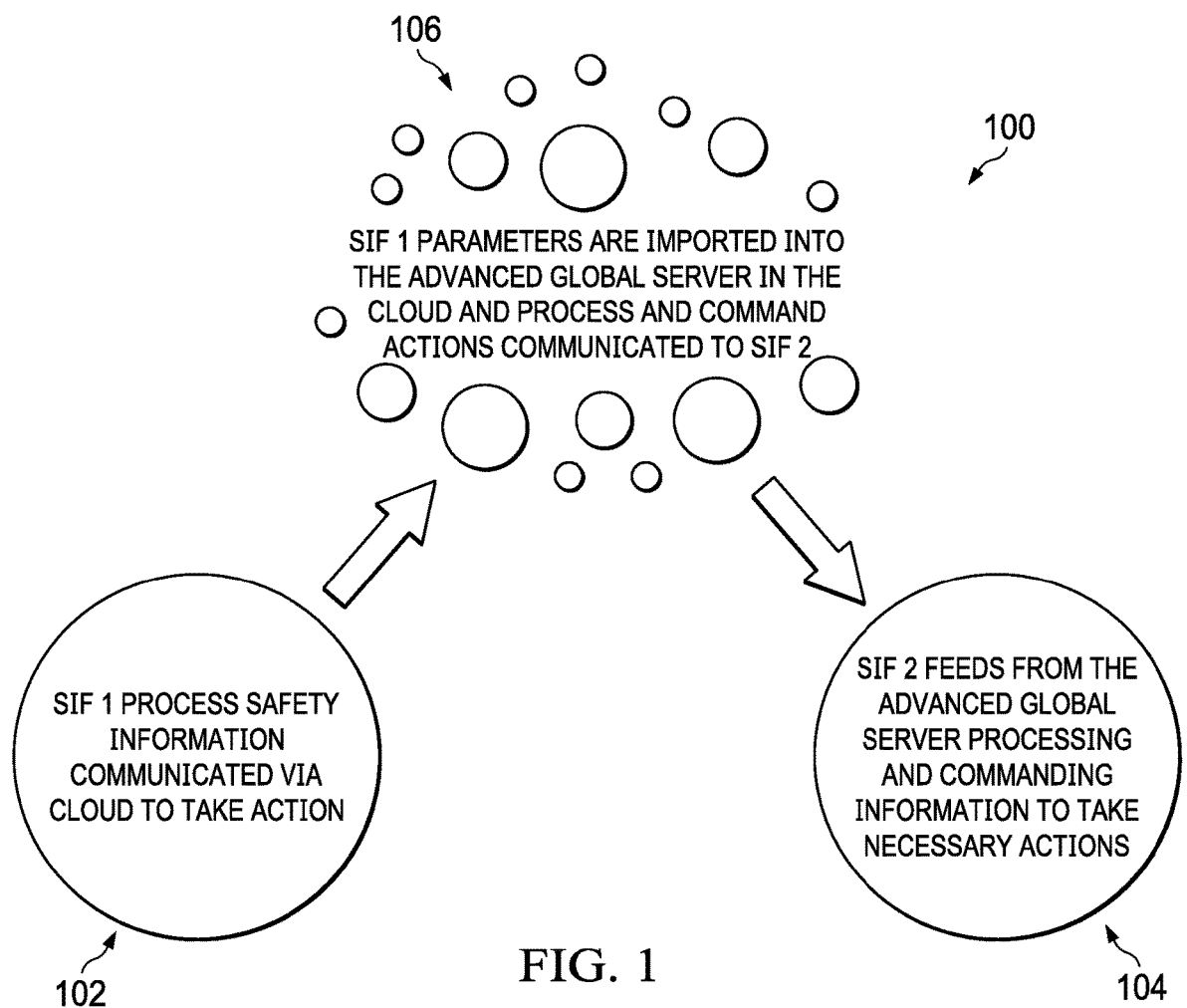
FIG. 1 is a diagram showing an example of a schematic of a system, according to some implementations of the present disclosure.

The following detailed description describes techniques for linking geographically separated safety instrumented systems (SISs) through redundant, reliable and functional safety certifiable communication systems among involved SISs, utilizing for example Cloud technology, or any other functional safety certified (or certifiable) communication protocol. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features. For example, the same concepts can be achieved by any other communication protocol that will allow distant and reliable communication of process parameters. Using the Cloud is just an example.

Geographically-separated SISs that are linked can include, for example, Safety Instrumented Function (SIFs). Process conditions and process parameters can be constantly monitored, for example, by safety instrumentation in the SIFs that can provide inputs to a logic solver. Using the inputs, the logic solver can make decisions based on pre-defined logic that may include artificial intelligence and data analytics advanced solutions, customized with rules that designate an action to be performed in response to a detected process event. The logic can process setting limits or trip set points, for example. As a result, the logic can trigger an action on final elements (for example, valves, pumps, compressors, or contactors) that belong to a safety loop. The triggering can occur, for example, when a certain dangerous process condition is met, such as process parameters reaching a pre-defined trip set point.

A process controller can control processes that span one or more systems at one or more locations. The outcome of a particular process trip can be, for example, an actuation of the final elements belonging to a stated SIF, referred to here as SIF 1. In this example, a goal of the process (and a design goal of the SIF 1) includes achieving the safe state of the process, including preventing the occurrence of a hazardous event. However, when the final elements actuate as a result of the SIF 1 actuation, it is quite common that a cascade hazardous effect is created that can propagate to the upstream side of the process. The upstream side, for example, may not be directly monitored either by the SIF 1 or by the same process controller.

A common practice in conventional systems is that the cascade effect is dealt with by a different and independent SIF (referred to here as SIF 2). In this example, the SIF 2 can belong to (and be controlled by) a safety system that is physically separated by a long distance (for example, hundreds of miles) from the SIF 1.

Techniques can be used to provide an intrinsic correlation using, for example, one or both of Cloud, Edge and advance global server computing concepts between SIF 1 and SIF 2. The correlation can yield an opportunity to prevent the escalation of a hazardous scenario that arises, for example, as a consequence of a SIF 1 activation. Preventing the escalation can, for example, mitigate the cascade effect that occurs when SISs are actuated either spuriously or under real demand (or fail to actuate as intended by design).

Valves, for example, are often the final elements in a safety loop. However, closure of the valves due to real or spurious demand of the SIS may create undesired process safety hazardous situations in an upstream system. Conversely, failure to close the valve under a real demand may also lead to an undesired event in the downstream of the system. The techniques of the present disclosure can be used to mitigate the occurrence of those hazardous situations that arise as a cascade effect that may generate collateral damage, for example, in an upstream system. Or conversely, provide prevention of escalation of an undesired event in the downstream system.

Techniques of the present disclosure can include gathering the necessary inputs from the SIS and using the inputs as decision-making tools artificial intelligence and data analytics advanced solutions. For example, the inputs can be imported into a communication system that enables the use of this diagnostic information beyond the typical (physical) boundaries of facilities. For example, Cloud technologies can enable the inputs used in decision-making tools to be communicated to distant locations in real time. The real-time communication can make it possible for equipment in the distant locations to be stopped (or adjusted) in order to prevent the hazardous scenario or prevent the escalation of hazardous scenario event. The term real-time can correspond to events that occur within a specified period of time, such as within seconds or minutes.

Types of incidents, including incidents in the oil and gas and petro-chemical industries that have resulted from not having real-time communication (and correlation between SISs), include typical hazardous event scenarios. A first example is the overpressure in one or more upstream systems that can result from an emergency shutdown (ESD) valve closure at the inlet of a plant geographically distant from the source upstream. A second example is a mechanical surge in a piping system that occurs as a consequence of a sudden valve closure at the inlet of the receiving tank. A third example is the overfilling of tanks due to failure of a local ESD (for example, in which the valve did not close upon a real SIF demand), allowing a continuous flow of a hydrocarbon product into a tank from a geographically distant upstream pump. These types of hazardous event scenarios can be avoided, for example, using systems and methods that combine hardware, communication, for example, one or both of Cloud and Edge computing technology, a highly-reliable (up to safety integrity level (SIL) 3) advance global server suitable for functional safety applications and software to minimize the likelihood of the occurrence of undesired consequences derived from the activation (or lack of activation) of a SIF.

FIG. 1 is a diagram showing an example of a schematic of a system 100, according to some implementations of the present disclosure. Parameters captured by and conforming to a SIF 1 102 are gathered and exported into the Cloud 106 environment with advanced and highly-reliable processing capabilities (up to SIL 3) suitable for safety system applications, which safely and reliable communicate output results to a SIF 2 104. Feeds from SIF 1 102 are used as input to advance processing of information in the Cloud 106, to take corrective and preventive measures in SIF 2.

Figure 2:
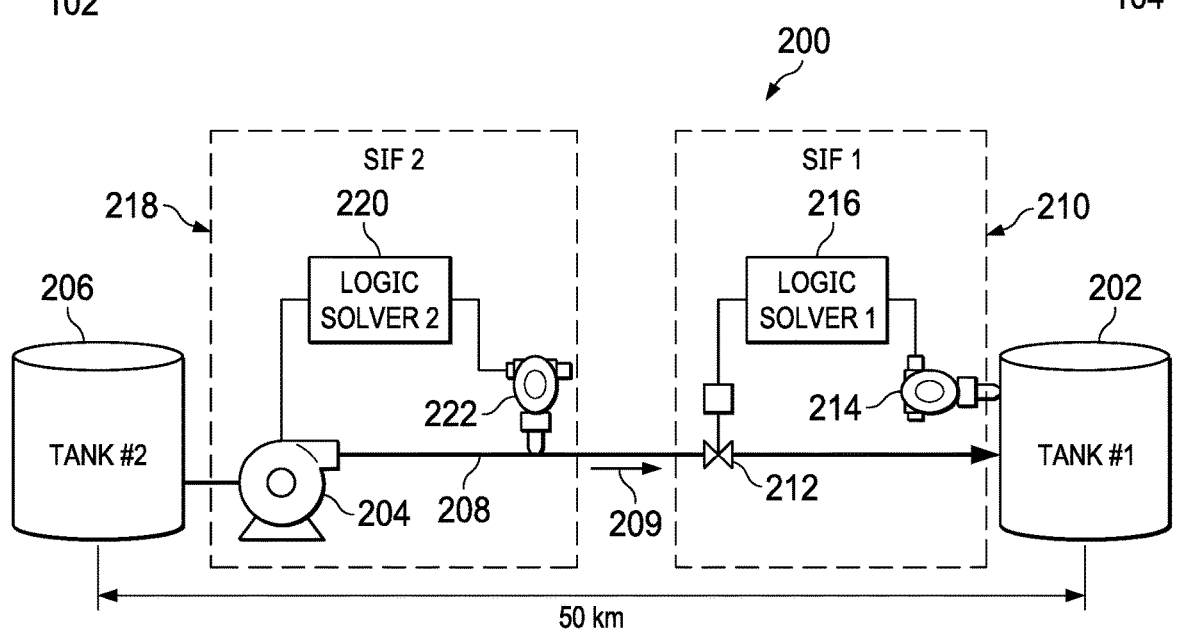
FIG. 2 is a diagram showing an example of a schematic of a pipeline system, according to some implementations of the present disclosure.

FIG. 2 is a diagram showing an example of a schematic of a pipeline system 200, according to some implementations of the present disclosure. A first tank 202 ("Tank #1") receives gasoline, for example, that is shipped by a pump 204 which is transferring the liquid inventory by pumping out the gasoline from a tank farm. A summary of the events in this example can include the following. A gasoline transfer is occurring from a second tank 206 ("Tank #2") from a distant tank farm. The transfer Pump #2 204 is emptying Tank #2 and shipping the product through long distance piping 208. The piping 208 has a flow direction 209. The piping 208 has a length, for example, of 50 kilometers (km), connecting Pump #2 204 to receiving Tank #1.

The receiving Tank #1 is protected against a hazardous scenario with a first SIF 210 ("SIF 1") designed to prevent overfilling of the first tank 202. For example, upon a high-level detection, a valve 212 ("Valve #1") is closed at the inlet of Tank #1, preventing the overfilling of the first tank 202. A high high level trip (HH) 214 can detect the potential over-filling, for example. Valve #1 212 is physically located in proximity to the local safety control system, allowing hardwiring the signals from the Tank #1 level transmitter to the Tank #1's safety logic solver 216, and from the safety logic solver 216 to Valve #1 212 (a final element). However, SIF 1 does not have any connection whatsoever with Pump #2 204 that may remain pumping from afar (for example, 50 km away) even after the high liquid level is detected and Valve #1 closed by the actuation of SIF 1.

The sudden closure of Valve #1 that results from a real SIF 1 demand preventing the overfilling of Tank #1 may generate, for example, a cascade effect commonly known as mechanical surge. In this example, if the mechanical surge is not diagnosed and designed correctly, the mechanical surge has the potential for a catastrophic failure of the pipeline system 200 due, for example, to the pressure peaks (mechanical surge) experienced in the pipeline system 200. Pressure waves may be generated, for example, as a result of a blocked outlet that does not allow the fluid to enter Tank #1.

As briefly described, SIF 1 offers a reliable protection against the hazardous scenario of overfilling Tank 1. In this example, the pipeline system 200 can initiate a cascade effect that creates a potential hazardous event to the upstream pipeline system due to the mechanical surge phenomenon.

The techniques of the disclosure includes can use, for example, Cloud technology, Edge computing, or both to prevent or mitigate the collateral (or cascade) effects of the hazardous scenario as previously described. Following the same example, process information (including a high-level indication in Tank #1 demanding a first SIF 210 ("SIF 1") and any other information such as process alarms) can be recorded and further processed by a highly-reliable (up to SIL 3 capable) advance global server in the Cloud environment. This can enable the transport of information in real time to actuate a second SIF 218 ("SIF 2") that is remotely located at the same location as the pump station is (for example, Pump #2 204). As a result, necessary and immediate actions can be taken to prevent or eliminate the cascaded effect. The actions can be accomplished by having, for example, a connectivity using Cloud computing. The actions can include, for example, stopping Pump #2 204 to prevent or mitigate the mechanical surge (or piping system overpressure) effect as the consequence of SIF 1 demand. The second SIF 218 can include, for example, Tank #2's safety logic solver 220 that communicates and triggers a Pump #2 204 trip as a leading and preventative action to avoid a high high pressure (HH) reading in 222. The high high pressure on 222 will never be reached due to the fore-thinking action, more importantly the surge phenomenon affecting system 200 is mitigated as the pump 204 is shutdown based on parameters driven by SIF 210.

In this way, the concept of the elimination of cascading effects (for example overpressure or mechanical surge) has a wide application that is not limited either by geographical locations or by hardwire constraints. This can be accomplished because of, for example, emerging Cloud technology and Edge computing, allowing remote areas to be part of distributed process safety concepts that are not currently used by conventional systems philosophies and designs. Although the examples used in the present disclosure are related to gasoline pipelines, the techniques of the present disclosure can be applied to other types of oil and gas and petro-chemicals, other types of pipelines (petro-chemical or not), and other systems that are not pipeline-related (for example, transportation systems, weather systems, and man-made and natural disasters, city flooding prevention).

In order to achieve the inter-working between two or more SIFs (for example, SIF 1, SIF 2, . . . $SIF_n$, where n: 1, 2, . . . , n), a highly-reliable communication infrastructure can be integrated with a SIF solution. The need for such integration between SIFs can be determined during an initial design phase, for example, as identified and captured using a Hazard and Operability (HAZOP) study. A study can be conducted for an existing pipeline or a new pipeline, for example. The design concept can include a design for a redundant communication infrastructure including a redundant communication medium that interconnects different SIF facilities along the process. This level of communication can be accomplished, for example, using a trio communication medium design model (or "design model") to ensure reliability and availability at all times, as shown in FIG. 3.

Figure 3:
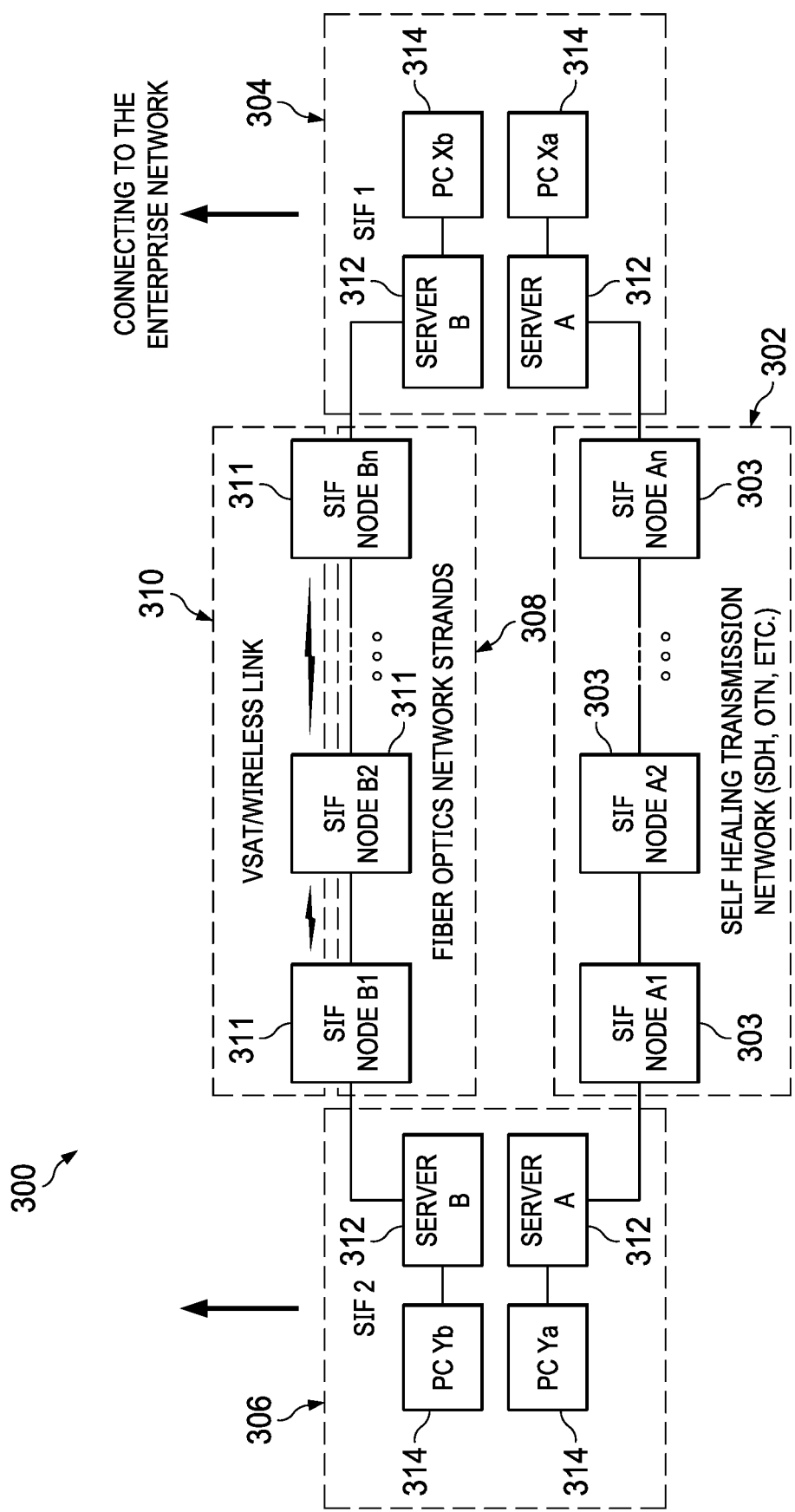
FIG. 3 is a diagram showing an example of a schematic of a pipeline system and self-healing transmission network, according to some implementations of the present disclosure.

FIG. 3 is a diagram showing an example of a schematic of a pipeline system 300 and self-healing transmission network, according to some implementations of the present disclosure. The pipeline system 300 includes a self-healing transmission network 302 that connects a first SIF 304 ("SIF 1") and a second SIF 306 ("SIF 2"). The self-healing transmission network 302 can be implemented, for example, in the form of a Synchronous Digital Hierarchy (SDH) or an Optical Transport Network (OTN). The SDH and OTN can be parallel to dedicated fiber optic network strands 308 that are part of a different routing. The self-healing transmission network 302 (including SIF nodes 303) can also include a long haul wireless solution, for example, including a Very Small Aperture Terminal (VSAT) or Point-to-Point Broadband Wireless link 310. The design model, including mediums 302, 308, and 310, can be based on each infrastructure medium being established so that if one medium becomes unavailable, the second or the third medium is still in operation. The mediums 308 and 310 can connect nodes 311. The design model's communication nodes can have the capability to sense communication medium outage and switch over to an alternate medium. Moreover, the design model can have the capability to send duplicated data using each communication route. Then, at the receiver end, the received data can be analyzed, and the most correct data value, based on voting, can be selected. The data selection can be based on a voting process of 2-out-of-3 values being closest to a correct, expected value. Each of the SIFs 304 and 306 can include or connect nodes including servers 312 and personal computers (PCs) 314. In some implementations, the system 300 can be interfaced as shown in FIG. 4.

Figure 4:
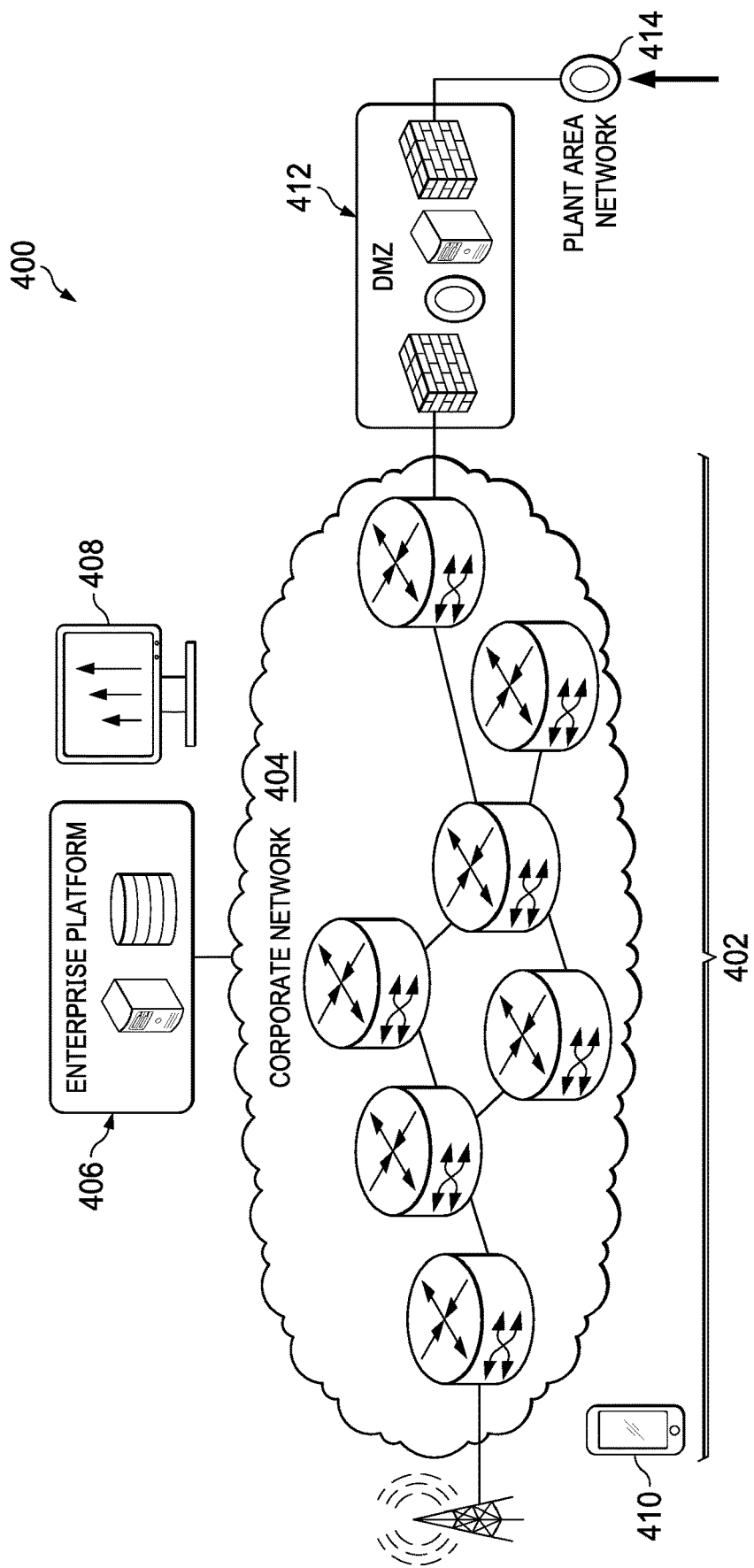
FIG. 4 is a diagram showing an example of a network, according to some implementations of the present disclosure.

FIG. 4 is a diagram showing an example of a routed Internet Protocol (IP) network 400, according to some implementations of the present disclosure. FIG. 4 depicts an example of an interface between a SIF layer and an enterprise layer, for example. End user desktop and or mobile Devices (Tablet, Smart Phone, etc.) can have access to the data based on preset templates and data access authorization levels. The network 400 includes a corporate enterprise layer 402, for example, including a corporate network 404 and an enterprise platform 406. The corporate enterprise layer 402 can enable advance data analytics, data presentations, and mobile end user access (for example, users of PCs 408 and mobile devices 410). To support this ability, the design model can include a secure communication link that uses multiple layers (or multi-layers) of cybersecurity protection, such as a demilitarized zone (DMZ) 412. The DMZ 412 can provide cybersecurity protection, for example, with respect to a plant area network 414. The corporate enterprise layer can be in the form of a Cloud Internet-of-Things (IoT) platform or a standard data server hosting system.

Figure 5:
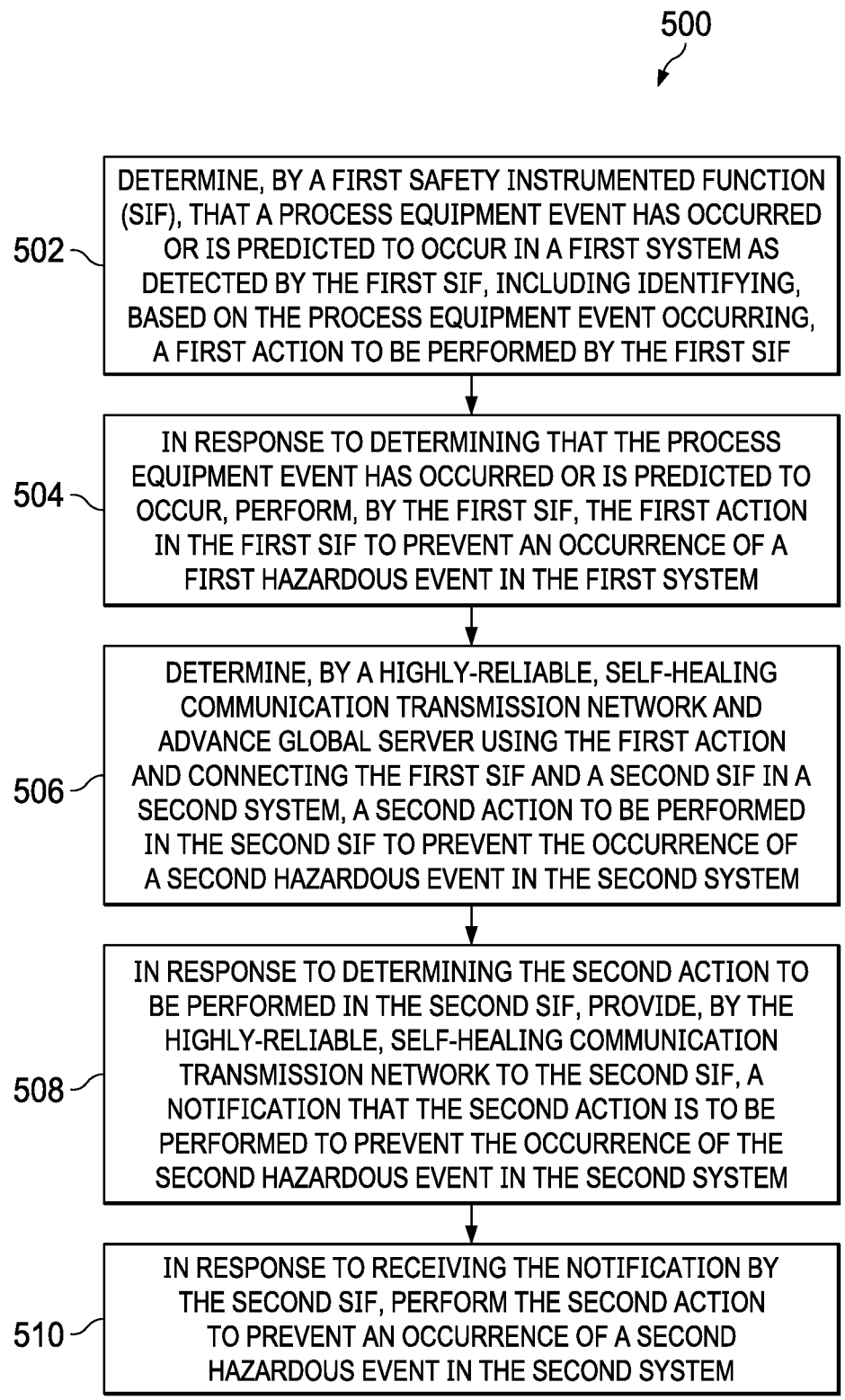
FIG. 5 is a flowchart of an example of a method for preventing collateral process safety risks using highly reliable communications in the Cloud, according to some implementations of the present disclosure.

FIG. 5 is a flowchart of an example of a method 500 for preventing collateral process safety risks using highly reliable communications and computing power in the Cloud, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a determination is made by a first SIF that a process equipment event has occurred or is predicted to occur in the first SIF. For example, the process equipment event can be a level trip indicating a potential over-filling of a first tank in the first SIF, as described with reference to FIG. 2. A first action to be performed by the first SIF is identified based on the process equipment event. As an example, the first action can be closing a valve of a source for the first tank, as described with reference to FIG. 2. Predicting the occurrence of the process equipment event can include, for example, analyzing parameters or readings (and associated trends and/or spikes) from one or more pieces of equipment and/or one or more alerts or notifications. From 502, method 500 proceeds to 504.

At 504, in response to determining that the process equipment event has occurred or is predicted to occur, the first action is performed by the first SIF to prevent an occurrence of a first hazardous event in the first SIF, as described with reference to FIG. 2. In some implementations, method 500 can further include executing a first logic solver (for example, safety logic solver 216) at the first SIF. Executing the first logic solver can include determining that the process equipment event has occurred or is predicted to occur in the first SIF, and in response to determining that the process equipment event has occurred or is predicted to occur, initiating the first action. From 504, method 500 proceeds to 506.

At 506, a second action to be performed in a second SIF is determined by a self-healing transmission network connecting the first SIF and the second SIF. The second action (for example, a commanding action), determined using the first action, is to prevent, by second SIF, the occurrence of a second hazardous event. For example, the second action can include stopping a pump in the second SIF, as described with reference to FIG. 2.

The self-healing transmission network can be included in a three-component redundant communications network connecting the first SIF and the second SIF. The three-component redundant communications network can further include dedicated fiber optic network strands and a VSAT wireless link, as described with reference to FIG. 3. From 506, method 500 proceeds to 508.

At 508, in response to determining the second action to be performed in the second SIF, a notification is provided by the self-healing transmission network to the second SIF. The notification indicates that the second action is to be performed, by the second SIF, to prevent the occurrence of the second hazardous event in the second SIF. From 508, method 500 proceeds to 510.

At 510, in response to receiving the notification by the second SIF, the second action is performed. For example, the second action can include stopping the pump 204. After 510, method 500 can stop.

Figure 6:
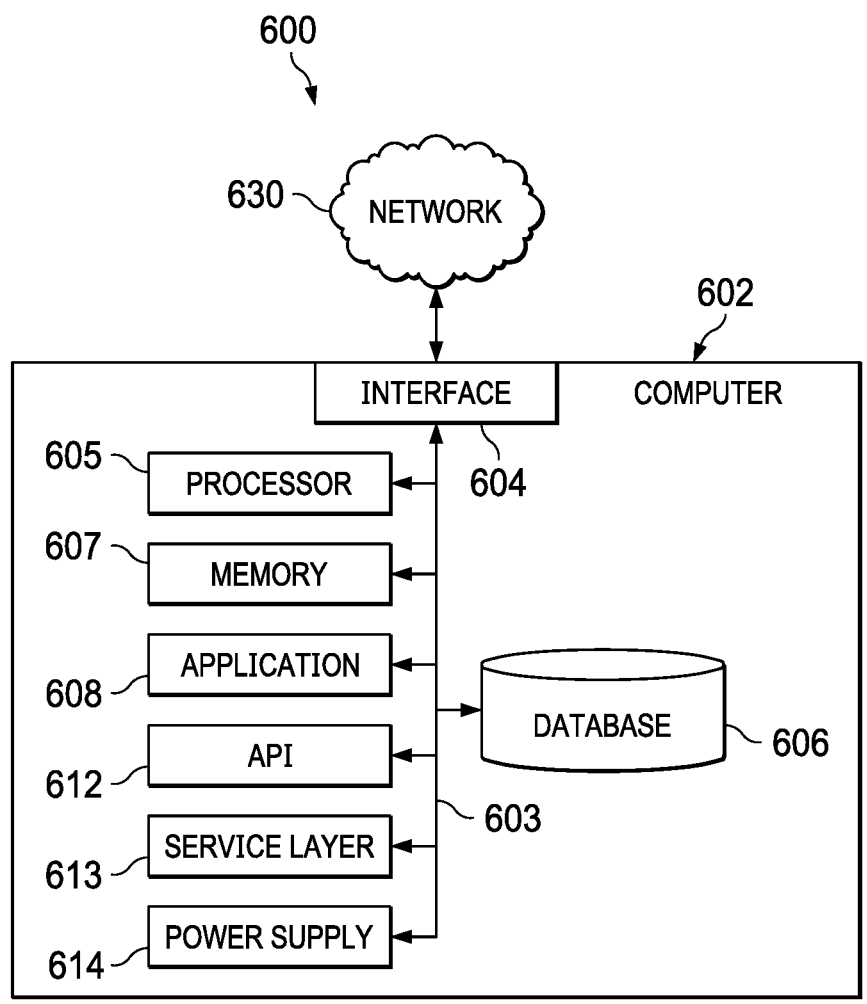
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. A determination is made by a first Safety Instrumented Function (SIF) that a process equipment event has occurred or is predicted to occur in a first system as detected by the first SIF, including identifying, based on the process equipment event occurring, a first action to be performed by the first SIF. In response to determining that the process equipment event has occurred or is predicted to occur, the first action is performed by the first SIF to prevent an occurrence of a first hazardous event in the first system. A determination is made by a highly-reliable (up to SIL3) advance global server, via a high-reliable self-healing communication transmission network using the first action and connecting the first SIF and a second SIF in a second system, that a second action is to be performed in the second SIF to prevent the occurrence of a second hazardous event in the second system. In response to determining the second action to be performed in the second SIF, a notification is provided by the highly-reliable, self-healing communication transmission network to the second SIF that the second action is to be performed to prevent the occurrence of the second hazardous event in the second system. In response to receiving the notification by the second SIF, the second action is performed to prevent the occurrence of a second hazardous event in the second system.

The foregoing and other described implementations can each, optionally, include one or more of the following features:

A first feature, combinable with any of the following features, where the process equipment event is a level trip indicating a potential over-filling of a first tank by the first SIF in the first system.

A second feature, combinable with any of the previous or following features, where the first action is closing a final element, including a valve, of a source for the first tank.

A third feature, combinable with any of the previous or following features, where the second action includes stopping a process equipment, including a pump by the second SIF in the second system.

A fourth feature, combinable with any of the previous or following features, the method further including executing a first logic solver at the first SIF, where executing the first logic solver includes determining that the process equipment event has occurred or is predicted to occur by the first SIF and, in response to determining that the process equipment event has occurred or is predicted to occur, initiating the first action in the first system.

A fifth feature, combinable with any of the previous or following features, where the highly-reliable, self-healing communication transmission network is included in a redundant communications network connecting the first SIF and the second SIF using cloud or edge computing using decision-making tools as an artificial intelligence and data analytics advanced solutions, having corresponding real commanded actions in systems the first and second systems.

A sixth feature, combinable with any of the previous or following features, where the highly-reliable, redundant communications network further includes dedicated fiber optic network strands and a Very Small Aperture Terminal (VSAT) wireless link.

In a second implementation, a non-transitory, computer-readable medium stores one or more instructions executable by a computer system to perform operations including the following. A determination is made by a first Safety Instrumented Function (SIF) that a process equipment event has occurred or is predicted to occur in a first system as detected by the first SIF, including identifying, based on the process equipment event occurring, a first action to be performed by the first SIF. In response to determining that the process equipment event has occurred or is predicted to occur, the first action is performed by the first SIF to prevent an occurrence of a first hazardous event in the first system. A determination is made by a highly-reliable, self-healing communication transmission network using the first action and connecting the first SIF and a second SIF in a second system, that a second action is to be performed in the second SIF to prevent the occurrence of a second hazardous event in the second system. In response to determining the second action to be performed in the second SIF, a notification is provided by the highly-reliable, self-healing communication transmission network to the second SIF that the second action is to be performed to prevent the occurrence of the second hazardous event in the second system. In response to receiving the notification by the second SIF, the second action is performed to prevent the occurrence of a second hazardous event in the second system.

The foregoing and other described implementations can each, optionally, include one or more of the following features:

A first feature, combinable with any of the following features, where the process equipment event is a level trip indicating a potential over-filling of a first tank by the first SIF in the first system.

A second feature, combinable with any of the previous or following features, where the first action is closing a final element, including a valve, of a source for the first tank.

A third feature, combinable with any of the previous or following features, where the second action includes stopping a process equipment, including a pump by the second SIF in the second system.

A fourth feature, combinable with any of the previous or following features, the operations further including executing a first logic solver at the first SIF, where executing the first logic solver includes determining that the process equipment event has occurred or is predicted to occur by the first SIF and, in response to determining that the process equipment event has occurred or is predicted to occur, initiating the first action in the first system.

A fifth feature, combinable with any of the previous or following features, where the highly-reliable, self-healing communication transmission network is included in a redundant communications network connecting the first SIF and the second SIF using cloud or edge computing using decision-making tools as an artificial intelligence and data analytics advanced solutions, having corresponding real commanded actions in the first and second systems.

A sixth feature, combinable with any of the previous or following features, where the highly-reliable, redundant communications network further includes dedicated fiber optic network strands and a Very Small Aperture Terminal (VSAT) wireless link.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A determination is made by a first Safety Instrumented Function (SIF) that a process equipment event has occurred or is predicted to occur in a first system as detected by the first SIF, including identifying, based on the process equipment event occurring, a first action to be performed by the first SIF. In response to determining that the process equipment event has occurred or is predicted to occur, the first action is performed by the first SIF to prevent an occurrence of a first hazardous event in the first system. A determination is made by a highly-reliable, self-healing communication transmission network using the first action and connecting the first SIF and a second SIF in a second system, that a second action is to be performed in the second SIF to prevent the occurrence of a second hazardous event in the second system. In response to determining the second action to be performed in the second SIF, a notification is provided by the highly-reliable, self-healing communication transmission network to the second SIF that the second action is to be performed to prevent the occurrence of the second hazardous event in the second system. In response to receiving the notification by the second SIF, the second action is performed to prevent the occurrence of a second hazardous event in the second system.

The foregoing and other described implementations can each, optionally, include one or more of the following features:

A first feature, combinable with any of the following features, where the process equipment event is a level trip indicating a potential over-filling of a first tank by the first SIF in the first system.

A second feature, combinable with any of the previous or following features, where the first action is closing a final element, including a valve, of a source for the first tank.

A third feature, combinable with any of the previous or following features, where the second action includes stopping a process equipment, including a pump by the second SIF in the second system.

A fourth feature, combinable with any of the previous or following features, the operations further including executing a first logic solver at the first SIF, where executing the first logic solver includes determining that the process equipment event has occurred or is predicted to occur by the first SIF and, in response to determining that the process equipment event has occurred or is predicted to occur, initiating the first action in the first system.

A fifth feature, combinable with any of the previous or following features, where the highly-reliable, self-healing communication transmission network is included in a redundant communications network connecting the first SIF and the second SIF using cloud or edge computing using decision-making tools as an artificial intelligence and data analytics advanced solution, having corresponding real commanding actions in the first and second systems.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   determining, by a first Safety Instrumented Function (SIF) by analyzing readings and associated trends on one or more pieces of equipment, that a process equipment event affecting process safety of the one or more pieces of equipment is predicted to occur in a first system as detected by the first SIF, including identifying, based on the process equipment event occurring, a first action to be performed by the first SIF;
   performing, by the first SIF, the first action in the first SIF to prevent an occurrence of a first hazardous event in the first system;
   determining, by a highly-reliable, self-healing communication transmission network using the first action and connecting the first SIF and a second SIF in a second system, a second action to be performed in the second SIF to prevent the occurrence of a second hazardous event affecting process safety in the second system;
   providing, by the highly-reliable, self-healing communication transmission network to the second SIF, a notification that the second action is to be performed to prevent the occurrence of the second hazardous event in the second system;
   performing the second action to prevent an occurrence of the second hazardous event affecting process safety in the second system; and
   determining, by the highly-reliable, self-healing communication transmission network, that performing the second action leads to achieving a safe state of the highly-reliable, self-healing communication transmission network.

2. The computer-implemented method of claim 1, wherein the process equipment event is a level trip indicating a potential over-filling of a first tank by the first SIF in the first system.

3. The computer-implemented method of claim 2, wherein the first action is closing a final element, including a valve, of a source for the first tank.

4. The computer-implemented method of claim 1, wherein the second action includes stopping a process equipment, including a pump by the second SIF in the second system.

5. The computer-implemented method of claim 4, further comprising executing a first logic solver at the first SIF, wherein executing the first logic solver comprises:
   determining that the process equipment event is predicted to occur by the first SIF; and
   initiating the first action in the first system.

6. The computer-implemented method of claim 1, wherein the highly-reliable, self-healing communication transmission network is included in a redundant communications network connecting the first SIF and the second SIF using cloud or edge computing using decision-making tools as an artificial intelligence and data analytics advanced solution, having corresponding real actions in systems the first and second systems.

7. The computer-implemented method of claim 6, wherein the highly-reliable, redundant communications network further includes dedicated fiber optic network strands and a Very Small Aperture Terminal (VSAT) wireless link.

8. A non-transitory, computer-readable medium storing one or more instructions executable by a computer system to perform operations comprising:
   determining, by a first Safety Instrumented Function (SIF) by analyzing readings and associated trends on one or more pieces of equipment, that a process equipment event affecting process safety of the one or more pieces of equipment is predicted to occur in a first system as detected by the first SIF, including identifying, based on the process equipment event occurring, a first action to be performed by the first SIF;
   performing, by the first SIF, the first action in the first SIF to prevent an occurrence of a first hazardous event in the first system;
   determining, by a highly-reliable, self-healing communication transmission network using the first action and connecting the first SIF and a second SIF in a second system, a second action to be performed in the second SIF to prevent the occurrence of a second hazardous event affecting process safety in the second system;
   providing, by the highly-reliable, self-healing communication transmission network to the second SIF, a notification that the second action is to be performed to prevent the occurrence of the second hazardous event in the second system;
   performing the second action to prevent an occurrence of the second hazardous event affecting process safety in the second system; and
   determining, by the highly-reliable, self-healing communication transmission network, that performing the second action leads to achieving a safe state of the highly-reliable, self-healing communication transmission network.

9. The non-transitory, computer-readable medium of claim 8, wherein the process equipment event is a level trip indicating a potential over-filling of a first tank by the first SIF in the first system.

10. The non-transitory, computer-readable medium of claim 9, wherein the first action is closing a final element, including a valve, of a source for the first tank.

11. The non-transitory, computer-readable medium of claim 8, wherein the second action includes stopping a process equipment, including a pump by the second SIF in the second system.

12. The non-transitory, computer-readable medium of claim 11, the operations further comprising executing a first logic solver at the first SIF, wherein executing the first logic solver comprises:
   determining that the process equipment event predicted to occur by the first SIF; and
   initiating the first action in the first system.

13. The non-transitory, computer-readable medium of claim 8, wherein the highly-reliable, self-healing communication transmission network is included in a redundant communications network connecting the first SIF and the second SIF using cloud or edge computing using decision-making tools as an artificial intelligence and data analytics advanced solution, having corresponding real actions in systems the first and second systems.

14. The non-transitory, computer-readable medium of claim 13, wherein the highly-reliable, redundant communications network further includes dedicated fiber optic network strands and a Very Small Aperture Terminal (VSAT) wireless link.

15. A computer-implemented system, comprising:
   one or more processors; and
   a non-transitory computer-readable storage medium coupled to the one or more processors and storing programming instructions for execution by the one or more processors, the programming instructions instructing the one or more processors to perform operations comprising:
      determining, by a first Safety Instrumented Function (SIF) by analyzing readings and associated trends on one or more pieces of equipment, that a process equipment event affecting process safety of the one or more pieces of equipment is predicted to occur in a first system as detected by the first SIF, including identifying, based on the process equipment event occurring, a first action to be performed by the first SIF;
      performing, by the first SIF, the first action in the first SIF to prevent an occurrence of a first hazardous event in the first system;
      determining, by a highly-reliable, self-healing communication transmission network using the first action and connecting the first SIF and a second SIF in a second system, a second action to be performed in the second SIF to prevent the occurrence of a second hazardous event affecting process safety in the second system;
      providing, by the highly-reliable, self-healing communication transmission network to the second SIF, a notification that the second action is to be performed to prevent the occurrence of the second hazardous event in the second system;
      performing the second action to prevent an occurrence of the second hazardous event affecting process safety in the second system; and
      determining, by the highly-reliable, self-healing communication transmission network, that performing the second action leads to achieving a safe state of the highly-reliable, self-healing communication transmission network.

16. The computer-implemented system of claim 15, wherein the process equipment event is a level trip indicating a potential over-filling of a first tank by the first SIF in the first system.

17. The computer-implemented system of claim 16, wherein the first action is closing a final element, including a valve, of a source for the first tank.

18. The computer-implemented system of claim 15, wherein the second action includes stopping a process equipment, including a pump by the second SIF in the second system.

19. The computer-implemented system of claim 18, the operations further comprising executing a first logic solver at the first SIF, wherein executing the first logic solver comprises:
   determining that the process equipment event is predicted to occur by the first SIF; and
   initiating the first action in the first system.

20. The computer-implemented system of claim 15, wherein the highly-reliable, self-healing communication transmission network is included in a redundant communications network connecting the first SIF and the second SIF using cloud or edge computing using decision-making tools as an artificial intelligence and data analytics advanced solution, having corresponding real actions in systems the first and second systems.

* * * * *